UNITED STATES PATENT OFFICE 2,128,198

22,23-DIHYDROERGOSTEROL AND MANUFACTURE THEREOF

Adolf Windaus, Gottingen, Germany, assignor to Winthrop Chemical Company, Inc., New York, N. Y., a corporation of New York No Drawing. Application March 19, 1937, Serial No. 131,778. In Germany December 9, 1933

4 Claims. (Cl. 260—397)

This invention relates to 22,23-dihydroergosterol and to a process of preparing the same.

Ergosterol and certain products which are formed as intermediate products when transforming ergosterol into an antirachitically active product by ultra violet irradiation, hitherto have been considered as the only substances which can be transformed into an antirachitically active product by ultra violet irradition. Antirachitic activation by irradiation of other substances always was due to a more or less great ergosterol content of the irradiated initial material. There are, however, differences as to the antirachitic activity of vitamin D obtained by irradiation of ergosterol and of vitamin D occurring in natural sources, for instance, in cod liver oil which still leaves the possibility that the vitamin D prepared artificially from ergosterol and the natural vitamin D are not identical. The difference in the activity of vitamin D preparations of different origin has been established, for instance, by the fact that one rat unit of vitamin D of cod liver oil is much more effective against the leg weakness of chicken than one rat unit of vitamin D prepared by irradiation of ergosterol. It is therefore still the problem to explore the nature of the natural vitamin D and to prepare a vitamin D artificially which shows an activity equal or similar to the activity of the natural vitamin D. Having this problem in mind I considered that by chemical modifications of ergosterol a provitamin might be obtained yielding on ultra violet irradiation an antirachitically active product. I have subjected ergosterol to hydrogenation processes. Ergosterol has the formula:

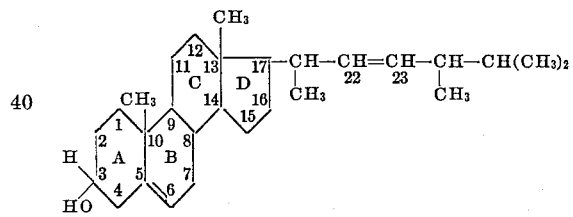

The formula shows that three double bonds are contained in the ergosterol molecule. Hence, a number of different hydrogenation products are possible in view of the different positions of the double bonds in the ergosterol molecule and depending on how many of the double bonds are saturated by the hydrogenation process. When introducing two hydrogen atoms into the ergosterol molecule according to the usual methods, for instance, with hydrogen in the presence of palladium black or with sodium and alcohol, the said two hydrogen atoms are added only in ring B of the ergosterol molecule, whereas the double bond between the carbon atoms 22 and 23 remains unchanged. On irradiation of the dihydroergosterols thus obtained only antirachitically inactive products were obtained, in other words, by the introduction of two hydrogen atoms into ring B of the ergosterol molecule ergosterol has been deprived of its provitamin property. By a particular process I have also succeeded in the preparation of 22,23-dihydroergosterol. It is most surprising that this hydrogenation product of ergosterol, contrary to other dihydroergosterols, has the property of being a provitamin D. This invention refers to this new artificially prepared provitamin D and to a process of preparing it.

In accordance with the present invention the said new provitamin is obtainable when transforming ergosterol or its esters into an addition compound with an ethylene-cis-dicarboxylic acid anhydride, such as maleic acid anhydride and citraconic acid anhydride, by heating the said components with one another, preferably in the presence of a solvent, such as toluene, or xylene, and subjecting the well crystallized addition compound formed to catalytic hydrogenation until one mol. of hydrogen has been taken up. The addition compound of the dihydroergosterol, its esters respectively, with the ethylene-cis-dicarboxylic acid anhydride is then split by thermal decomposition. Thereupon the dihydroergosterol, its esters respectively, are obtained by distillation in a good vacuo and may be recrystallized to well crystalline products. As esters of ergosterol, of 22,23-dihydroergosterol respectively, first of all those of the lower fatty acids, preferably the acetic acid esters, come into consideration. The dihydroergosterol thus obtained differs from the other dihydroderivatives of ergosterol by its chemical behaviour and its physical properties. As to its chemical properties it is very similar to ergosterol but contains contrary to ergosterol only two double bonds. It melts at 152–153° C. and has a specific rotary power of $$[\alpha]_D^{19} = -109°$$

in chloroform solution. Similar to ergosterol it has an absorption spectrum which shows characteristic absorptions between 250 and 310 m$\mu$. However, on oxidation it does not yield methylisopropyl-acetaldehyde as is obtained by oxidation from ergosterol. From this fact it results that the double bond between the carbon atoms numbered 22 and 23 in the side chain of ergosterol has been saturated by the particular hydrogenation process referred to above; hence, the new dihydroergsterol is 22,23-dihydroergosterol having the formula $C_{28}H_{46}O$.

The 22,23-dihydroergosterol or its esters are transformed into an antirachitically highly active product by ultra violet irradiation.

The invention is further illustrated by the following example without being restricted thereto:

Example.—40 grams of ergosterol-acetate are heated with 15 grams of maleic acid anhydride in 100 ccs. of xylene for 8 hours to 130° C. Thereupon the xylene is distilled off in vacuo, the residue recrystallized from a small quantity of glacial acetic acid while slowly cooling, whereupon the addition product separates in massive blocks. It melts after recrystallization from acetic acid at 217° C. and displays a specific rotary power of $$[\alpha]_D^{19} = -19°$$

in 1% chloroform solution. The yield amounts to about 10 grams.

This substance melting at 217° C. is then dissolved in acetone or acetic ester and shaken in the presence of finely distributed palladium with hydrogen until just 1 mol. is taken up. The hydrogenation product after the solvent has been removed, is recrystallized from glacial acetic acid and yields on slowly cooling needles which on heating begins to sinter at 176° C. and melts at 203° C. This substance is the addition product "22,23-dihydroergosterylacetate-maleic acid anhydride" which is then transformed into the 22,23-dihydroergosterylacetate by thermal decomposition by means of high vacuum distillation.

The distillation in high vacuo is advantageously performed in small portions. The mixture is first heated in a retort for one hour in the vacuum of the water-jet pump to 220° C. and then distilled at 0.001 mm. pressure. The distillate which has accumulated in the neck of the retort is recrystallized from alcohol-ether or from acetic acid ester-acetone. It forms beautiful tablets melting at 157–158° C. and has a specific rotary power of $$[\alpha]_D^{17} = -74.8°$$

This substance is the 22,23-dihydroergosterylacetate which may be irradiated either directly or after saponification.

For the manufacture of the 22,23-dihydroergosterol the above specified acetate is saponified by heating for two hours with alcoholic caustic potash solution in nitrogen atmosphere. The free 22,23-dihydroergosterol which separates on the addition of water to the saponification mixture is recrystallized from acetic estermethanol. It forms needles melting at 152–153° C. and has a specific rotary power of $$[\alpha]_D^{19} = -109°$$

in chloroform solution. It crystallizes with crystal water which it gradually loses in vacuo at 100° C. Its absorption spectrum shows characteristic absorptions between 250–310 m$\mu$ which very much resemble those of the ergosterol. Its behaviour to maleic acid anhydride is the same as that of ergosterol. It differs from ergosterol, however, by its behaviour to ozone in that it yields no methyl-isopropyl-acetaldehyde in the oxidation process, the formation of the latter, however, being characteristic for ergosterol.

This is a continuation in part application of my copending application for Letters Patent Serial No. 755,840, filed Dec. 3, 1934.

I claim:—

1. The process which comprises subjecting an ergosterol compound selected from the group consisting of addition compounds of ergosterol and addition compounds of its esters with an ethylene-cis-dicarboxylic acid anhydride to catalytic hydrogenation until 1 mol. of hydrogen has been taken up, splitting the addition compound of the hydrogenation product formed by thermal decomposition and distilling in high vacuo.

2. The process which comprises subjecting the addition compound of ergosterol acetate and maleic acid anhydride to catalytic hydrogenation until 1 mol. of hydrogen has been taken up, splitting the addition compound of the hydrogenation product formed by thermal decomposition, distilling in high vacuo, recrystallizing the high boiling fraction from a solvent selected from the group consisting of alcohol-ether and acetic acid ester-acetone, saponifying the crystals of 22,23-dihydroergosterol-acetate thus obtained with an alcoholic solution of potassium hydroxide and recrystallizing the 22,23-dihydroergosterol formed.

3. A compound selected from the group consisting of 22,23-dihydroergosterol and its esters with organic carboxylic acids.

4. 22,23-dihydroergosterol melting at 152–153° C., having a specific rotary power $$[\alpha]_D^{19} = -109°$$

in chloroform solution, showing a characteristic absorption between 250 and 310 m$\mu$.

ADOLF WINDAUS.